V. L. DUHEM.
MOVING PICTURE MACHINE.
APPLICATION FILED MAY 15, 1911.
1,108,838.
Patented Aug. 25, 1914.
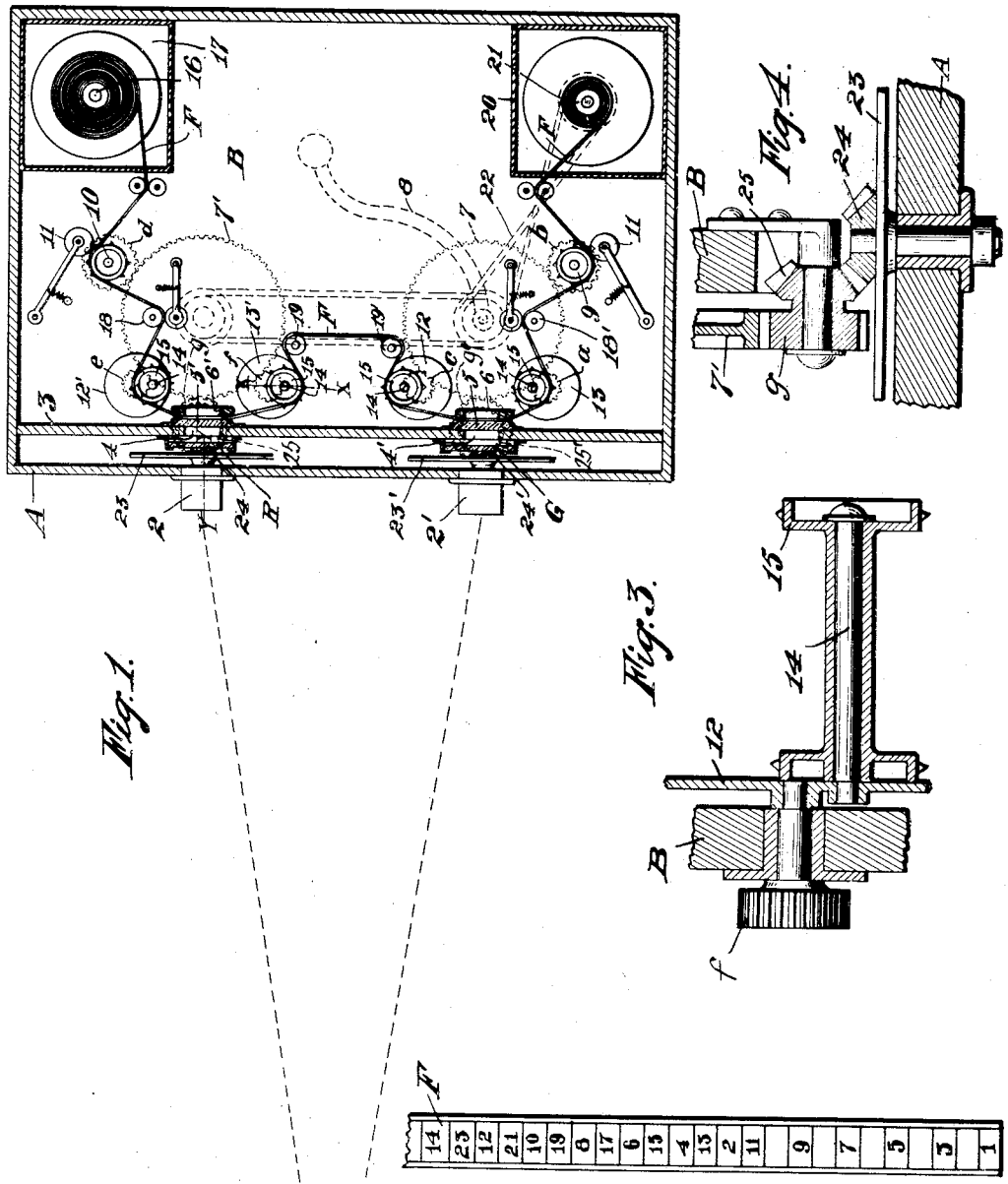
Witnesses:
R. S. Berry,
Thos Castberg
Inventor
Victor L. Duhem
By G. H. Strong.
His Atty.

UNITED STATES PATENT OFFICE.

VICTOR L. DUHEM, OF OAKLAND, CALIFORNIA, ASSIGNOR TO VIM MOTION PICTURE COMPANY, A CORPORATION OF CALIFORNIA.

MOVING-PICTURE MACHINE.

1,108,838.  Specification of Letters Patent.  Patented Aug. 25, 1914.

Application filed May 15, 1911. Serial No. 627,216

*To all whom it may concern:*

Be it known that I, VICTOR L. DUHEM, a citizen of the United States, residing at Oakland, in the county of Alameda and State of California, have invented new and useful Improvements in Moving-Picture Machines, of which the following is a specification.

This invention relates to a moving picture machine, such as is employed in taking or in exhibiting a series of photographs of objects, and particularly pertains to a machine for producing motion or kinetoscopic pictures in natural colors.

It is the object of this invention to provide a machine for photographing or displaying motion pictures in natural colors.

Another object is to provide a means for manipulating the film or long photographic strip used in taking or reproducing kinetoscopic pictures, by which the ribbon of film will be caused to travel continuously from one reel on to another, which means includes a simple mechanism for giving the film a reciprocating movement in conjunction with and during its constant travel, so as to cause it to intermittently assume a stationary relation to a fixed lens at a point adjacent the inner end thereof, but at the same time continue its movement from one reel to the other.

The purpose of this invention is to provide a means by which a portion of the film ribbon will be stationary in relation to one lens while another portion is moving in relation to another lens, which means alternates the relation of the film to the different lenses, so that a double series of photographs will be made on, or exhibited from the film in staggered or alternate arrangement, one series photographing or exhibiting images of one color, while the other series photographs or exhibits images of another color.

The invention consists of the parts and the combination and construction of parts as hereinafter more fully described and claimed, having reference to the accompanying drawings, in which—

Figure 1 is a vertical section of a moving picture camera showing the invention as applied. Fig. 2 is a detail showing a section of film ribbon and illustrating the arrangement of the exposures made by the camera shown in Fig. 1. Fig. 3 is a detail in section on the line X X, Fig. 1. Fig. 4 is a detail in section on the line Y Y, Fig. 1.

In the drawings, A represents a camera case of any suitable construction, on which a pair of spaced superposed lenses 2—2' are mounted, and 3 is a transverse partition in the case A, disposed thereacross a short distance from the inner end of the lenses 2—2', and having openings 4—4' registering with the lenses, and which openings are covered by transparent plates 5—5' mounted on the inner side of the partition. Gates 6—6' are mounted on the partitions 3 and are adapted to be closed against the inner faces of the plates 5—5' to press a ribbon of film F thereagainst, which film F passes between the plates 5—5' and gates 6—6', as will be later described. The camera case A is also provided with a partition B which extends longitudinally thereof at right angles to the partition 3, and revolubly mounted on the exterior of this partition B is a gear wheel 7 which is adapted to be rotated by means of a crank 8, indicated in dotted lines in Fig. 1, or in any other suitable manner. The gear 7 is meshed with a series of three pinions $a$, $b$ and $c$, shown in dotted lines in Fig. 1, which pinions are suitably disposed at intervals around the gear 7 and each pinion is mounted on a short shaft mounted in and extending through the partition B.

Mounted on the partition B above the gear wheel 7 and spaced therefrom, is a similar gear 7', which is adapted to be rotated in unison with and in the same direction as the gear 7, by means of suitable transmission mechanism, here shown in dotted lines in Fig. 1 as a belt, which passes around suitable pulleys on the outer faces of the gears 7—7'. The gear 7' also meshes with a series of three pinions, indicated in dotted lines in Fig. 1, and designated at $d$—$e$ and $f$, which pinions are mounted on short shafts extending through the partition B and are disposed at suitable intervals around the gear 7'.

The shafts on which the pinions $b$ and $d$ are mounted have sprocket wheels 9 and 10, respectively, mounted on their inner ends, which sprockets are adapted to engage perforations on the outer edges of the film ribbon F which is designed to pass thereover, an idler wheel 11 bearing against each of the sprocket wheels 9—10, to prevent the film jumping off the sprockets when in motion. Mounted on the inner ends of the shafts on which the pinions $a, c, e$ and $f$ are mounted, are disks 12—12′—13—13′, and mounted on the outer face of each disk is a pin 14 disposed eccentric to the center of the disk on which a sprocket wheel 15, corresponding to the sprocket wheels 9—10, is revolubly mounted.

The film F, on which the photographic impressions are to be made is wound on a reel 16 mounted in a film-box 17 arranged in the camera case A, and is fed from the box 17 over the sprocket 10, under a direction roller 18, over the sprocket 15 on the disk 12′, thence between the plate 5′ and the gate 6′ and around the sprocket 15 on the disk 13′, over and around direction rollers 19—19′ thence over and around the sprocket 15 on the disk 12, between the plate 5 and the gate 6, under and around the sprocket 15 on the disk 13 over a direction roller 18′, under the sprocket 9, and into a film box 20, where it is wound upon a reel 21, which reel is rotated by means of a resilient belt 22 from a pulley formed on the gear 7. A rotary shutter 23—23′ is mounted on the case A adjacent the inner end of each of the lenses 2—2′, and each shutter has a beveled pinion 24—24′ formed thereon, which meshes with a beveled pinion 25—25′ formed integral with a pinion $g$—$g$ constantly in mesh with the gears 7—7′.

The operation of the film moving portion of this invention is as follows: The film being rove over the various sprockets and direction rollers, as before described, from the reel 16 to the reel 21, the master gear 7 is rotated by means of the crank 8, which causes the gear 7′ and the pinions $a, b, c, d, e$ and $f$ to rotate and revolve the respective parts connected therewith; the pinion $d$ rotating the sprocket 10 to feed the film F from the reel 16 to the sprockets 15, and the pinion $b$ rotating the sprocket 9 to take up the film and deliver it to the reel 21 upon which it is wound by the action of the belt 22. As the rotation of the gears 7—7′ and pinions $b$—$d$ is constant, it will be seen that the movement of the film from one reel to the other will be continuous. The pinions $a, c, e, f$, also rotate as the gears 7—7′ revolve, and rotate the disks 12—12′, 13—13′ therewith, which disks carry the idler sprockets 15. These sprockets 15 being mounted eccentric to the center of the disks 12′—13′ are caused to move in a circle in unison, which movement acts to give the traveling length of film, passing between plate 5′ and gate 6′, between the sprockets 15 on the disks 12—13′, a reciprocating movement, the length of the stroke of which movement is approximately double the length of the surface of film exposed over the opening 4. From this it will be seen that by proportioning the pinions $e$—$f$ to the gear 7′ so that the speed of the reciprocal movement of the film will be equal to the speed of travel of the film when the reciprocal movement is in a direction opposite that of the direction of travel of the film, the film will be stationary in relation to the lens 2, and when the reciprocal movement is in the same direction as that of the travel of the film, the speed of the film in relation to the lens will be double that of the normal speed of the film at a point adjacent the reels 16 and 21. In like manner, the sprockets on the disks 12—13 being mounted eccentric to the center of the disks and on corresponding sides thereof, by reason of moving in a circle in unison, acts to give that portion of the film passing between the plate 5 and gate 6 in front of the lens 2′ a reciprocating movement, the length of the stroke of which movement is approximately double the length of the surface of film exposed over the opening 4′. This causes the film between the sprockets 15 on the disks 12—13 to be stationary in relation to the lens 2′, when the reciprocal movement is in the opposite direction of that of the travel of the film, and to double the speed of the film in relation to the speed at a point adjacent the reels 16 and 21, when the reciprocal movement is in the same direction as that of the normal travel of the film. By arranging the sprockets 15 on the disks 12—13 on the diametrically opposite side of those on the disks 12′—13′, as shown in Fig. 1, one portion of the film passing behind one lens will remain in stationary relation to that lens, while another portion of the film passing behind the other lens will be traveling at accelerated speed, this operation alternating between the lenses 2—2′, so that an exposure can be made first through the lens 2, then through the lens 2′, the shutters 23—23′ operating to successively open and close the lenses 2—2′. The pinions $g$—$g$ on the shutters 23—23′ are so proportioned in relation to the gears 7—7′ as to rotate the shutters 23—23′ one complete revolution during one complete reciprocation of the film, and each shutter, 23—23′ is provided with an open space so arranged as to necessarily open the lenses 2—2′ when the film is stationary in relation to the respective lenses, the shutters closing the lenses when the film moves in relation thereto, as before mentioned. By this arrangement a series of successive exposures may be made on the film while it is in continuous movement from one reel to the other; one exposure being made through the lens 2 and another through the lens 2′ at different points on the film, a distance equaling ten exposure areas intervening between the area exposed to the lens 2 and the area exposed to the lens 2′. By advancing the film behind each lens a distance equal to two exposure areas, and arranging the length of film between the two lenses so that the area skipped by the upper lens 2 will be exposed by the lower lens 2', a continuous series of exposures will be made throughout the length of the film. In the embodiment of this invention, a color filter or screen R is disposed between the inner end of the lens 2 and the opening 4, and a similar screen G is placed between the inner end of the lens 2' and the opening 4'. These screens or color filters R—G may be made of glass, or any other substance of suitable transparency, and are hereinafter described as being colored red and green, respectively, for the purposes of explanation, though other complimentary colors may be employed, if desired.

From the foregoing it will be seen that the film may be wound in either direction, as desired, the belt 22 being shifted to the reel 16 when the film is to be wound from the reel 21. This permits of the direction of travel of the film being reversed at any time.

It is obvious that while I have shown and described the invention as applied to a camera, it is equally applicable for use on projecting machines, reproducing machines, and in any apparatus where it is desired to give a ribbon an intermittent movement in relation to a fixed point.

In the operation of the invention a panchromatic film, which is sensitive to colored rays of light, is employed. In exposing the sensitized film to the action of the colored light rays passing through the two screens R and G, the images reflected by the lenses 2—2', will be registered upon the film according to their color. For instance, the red rays emanating from an object would be filtered and absorbed by the green screen G, so that no record or exposure of the red object would be produced on that portion of the film behind the lens 2' and screen G, other than its outline, while the image of the blue and green portions of the object are recorded upon that portion of the film, just mentioned. In like manner, the blue-green light rays are absorbed by the red screen R, so that no record of the blue-green portions of the object will be made and while the red portions of the object being projected through the red screen are recorded on that portion of the film opposite the red screen R, the recorded portions being opaque or dense in proportion to the amount of red rays passing through the screen R.

From the foregoing it will be seen that when the shutters 23—23' are moved to permit light rays to pass through the lenses 2—2' and screen R—G, that two separate exposures will be made simultaneously on the portions of the film spanning the openings 4—4', one of the exposures recording the blue-green images and the other recording the red images, of the objects photographed. The negative film thus produced, and which is the product of the machine constituting my present invention, is then reproduced upon a positive film, this positive film being colored on adjacent exposed areas, to correspond in color to the screens R—G, the portion of the positive film recording the green images being colored red and the portion recording the red images being colored green, so that when light rays are passed through the film, a photographic image corresponding in form and color to the image photographed will be reproduced. However, if color screens are used on the projecting machine corresponding to the screens R—G on the camera, it will not be necessary to color the positive film, as just described.

This machine is so constructed that two pictures are taken from different points of view; and when projected from these different points alternately and superposing each upon the other the following advantages or effects are secured: First, each picture is a distinct record of a color sensation, being photographed through a stationary color screen; second, flicker is eliminated entirely when this picture is projected upon a screen in the same manner in which it was taken. By superposing one picture upon the other I can do away entirely with the shutter, usually employed on a projecting machine, because the period of movement is so small in comparison to the period of rest, picture number one remaining upon the screen while number two, or the next one of the series is moving. This movement of change from one picture to the next is so rapid and occurs at the time the screen is illuminated by the previous picture, so that it cannot be noticed by the eye.

Having thus described my invention, what I claim and desire to secure by Letters Patent is:—

1. In an apparatus for the production of motion pictures in color, the combination with a pair of superposed spaced lenses, shutters therefor, and color screens adjacent to the shutters, of a pair of disks adjacent to each color screen, means for rotating said disks in unison, a film engaging wheel eccentrically mounted on each of said disks, said wheels so arranged in relation to each other that the wheels on the upper pair of disks will be below the axis thereof when the wheels on the lower pair of disks will be above the axis thereof, and means for directing a single film to and from said wheels.

2. In an apparatus for the production of motion pictures in color, the combination with a pair of superposed lenses, color screens behind the lenses and shutters interposed between the screens and lenses, of a pair of spaced gear wheels, means for rotating said gear wheels in unison, means for operating the shutter from said gear wheels, a pair of disks geared to each of said gear wheels, a film engaging wheel eccentrically mounted on each of said disks, arranged with the wheels on one pair of disks on corresponding sides of its axes, and with the wheels on the other pair of disks on the sides thereof opposite thereto, means for directing a single film to and from said wheels, and means controlled by one of the spaced gears for winding the film.

In testimony whereof I have hereunto set my hand in the presence of two subscribing witnesses.

VICTOR L. DUHEM.

Witnesses:
 CHARLES EDELMAN,
 C. C. COOK.